(12) United States Patent
Gilliland

(10) Patent No.: US 7,547,848 B2
(45) Date of Patent: Jun. 16, 2009

(54) STRUCTURE AND METHOD FOR A TWISTED BUS BAR FOR LOW IMPEDANCE POWER DISTRIBUTION AND ELECTROMAGNETIC FIELD SUPPRESSION

(75) Inventor: Don A. Gilliland, Rochester, MI (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 11/690,442

(22) Filed: Mar. 23, 2007

(65) Prior Publication Data

US 2008/0230256 A1    Sep. 25, 2008

(51) Int. Cl.
*H01B 5/00*    (2006.01)
(52) U.S. Cl. .............................. 174/126.1; 174/133 R; 174/133 B
(58) Field of Classification Search ............... 174/88 R, 174/68.2, 70 B, 71 B, 72 B, 99 B, 133 B, 174/149 B, 126.1, 133 R
See application file for complete search history.

(56) References Cited

U.S. PATENT DOCUMENTS 6,294,739 B1 *    9/2001    Becker ..................... 174/126.1
2001/0028547 A1 *   10/2001    Wagener ..................... 361/611

FOREIGN PATENT DOCUMENTS

EP    0 007 478    *   2/1980
EP    1 324 427    *   7/2003

* cited by examiner

*Primary Examiner*—William H Mayo, III
(74) *Attorney, Agent, or Firm*—Cantor Colburn LLP

(57)    ABSTRACT

A twisted pair symmetric bus bar structure for electric power distribution includes a first conductor; a second conductor; an insulator; wherein the first conductor and the second conductor form an interwoven alternating interlocking pattern; wherein the first and second conductors are formed from a series of Z-shaped sections; wherein the insulator is H-shaped and has a series of slots for receiving the first and second conductors; and wherein the insulator is sandwiched between the first and second conductor.

10 Claims, 5 Drawing Sheets

STRUCTURE AND METHOD FOR A TWISTED BUS BAR FOR LOW IMPEDANCE POWER DISTRIBUTION AND ELECTROMAGNETIC FIELD SUPPRESSION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates generally to electric power distribution and more particularly to a structure and method for forming a twisted pair bus bar with high current carrying capacity, low impedance characteristics, and electromagnetic field suppression.

2. Description of the Background

Twisted pair wiring and cabling has two conductors that are wound together for the purpose of canceling out electromagnetic interference (EMI) from external sources, as well as electromagnetic fields generated by the current in the conductors. The electric currents in the two conductors of the twisted pair are 180 degrees out of phase with each other. The normal mode currents to and from the load form a current loop whose magnetic field points in one direction. The next loop, since twisted, forms a magnetic field that is in the opposite direction from that of the first loop of the twisted pair. The net result is that farther away from the bus bar the fields tend to cancel each other.

Twisted pair technology is used extensively in power, telecommunications, data communications and audio distribution as a method to reduce the production of near radiated magnetic fields and to increase immunity to radiated fields produced elsewhere. It is commonly used as a low cost method of magnetic field shielding. Twisting allows the conductors to remain in close proximity such that through mutual induction, current flowing out to the load causes the return current to flow in the opposite direction. By twisting, the pair remains in close proximity while tending to cancel the produced magnetic field.

SUMMARY OF THE INVENTION

Embodiments of the present invention comprise a structure and a method for forming a twisted pair bus bar with high current carrying capacity, low impedance characteristics, and electromagnetic field suppression. In one embodiment, the structure includes: a first conductor; a second conductor; an insulator; wherein the first conductor and the second conductor form an interwoven alternating interlocking pattern; wherein the first and second conductors are formed from a series of Z-shaped sections; wherein the insulator is H-shaped and has a series of slots for receiving the first and second conductors; and wherein the insulator is sandwiched between the first and second conductor.

In another embodiment, a method for forming a twisted pair synthetic bus bar includes: forming a first conductor; forming a second conductor; forming an insulator; wherein the first and second conductors are formed from a series of modular units with bridging connections; wherein the modular units are joined by soldering the bridging connections together when the modular emits are arranged in an alternating fashion; wherein the insulator has a series of slots for receiving the bridging connections of the first and second conductors; and wherein the insulator is sandwiched between the first and second conductors.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, a solution is technically achieved for a structure and a method for forming a symmetric bus bar for power distribution with high current carrying capacity, low impedance characteristics, and electromagnetic field suppression properties utilizing twisted pair technology.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF SPECIFIC EMBODIMENTS

Embodiments of the present invention provide a structure and method for forming a symmetric bus bar for high current power distribution and delivery with low impedance and electromagnetic field suppression properties utilizing twisted pair technology. The close spacing of the power conducting line to the return conducting line (ground) minimizes the inductance of the symmetric bus bar. Due to the twisted structure of the symmetric bus bar, induced magnetic fields in the two conductors are 180 degrees out of phase through each twist of the symmetric bus bar, thereby resulting in the cancellation of the overall magnetic field. The symmetric bus bar is constructed in a modular fashion with Z-shaped sections. The joints between the modular sections are soldered to avoid resistive junctions at low frequencies that would render the symmetric bus bar too lossy. To facilitate the soldering of the modular sections, the top and bottom edges are exposed in the joining areas to provide bridging connections. In an alternative embodiment the formation of each of the power conducting lines and the return lines can be formed from a machine stamping of a conductive material. The symmetric bus bar can have various cross sections such as a square cross section, or a rectangular cross section.

The physical structure of the symmetric bus bar is such that the cross sectional area is sized to handle the high current levels present in a distribution bus bar. The flat surface provides a means to have a close proximity to a return current structure with a thin dielectric separating them. The dielectric and close spacing provides a distributed capacitance that tends to lower the driving impedance of the bus bar. Lowered distributed impedance provides the current at a distance that is needed by high-speed drivers to maintain their signal integrity without the supply going into droop. The distributed capacitance and lowered inductance provides more local storage for the load or source driver for the logic.

Figure 1:
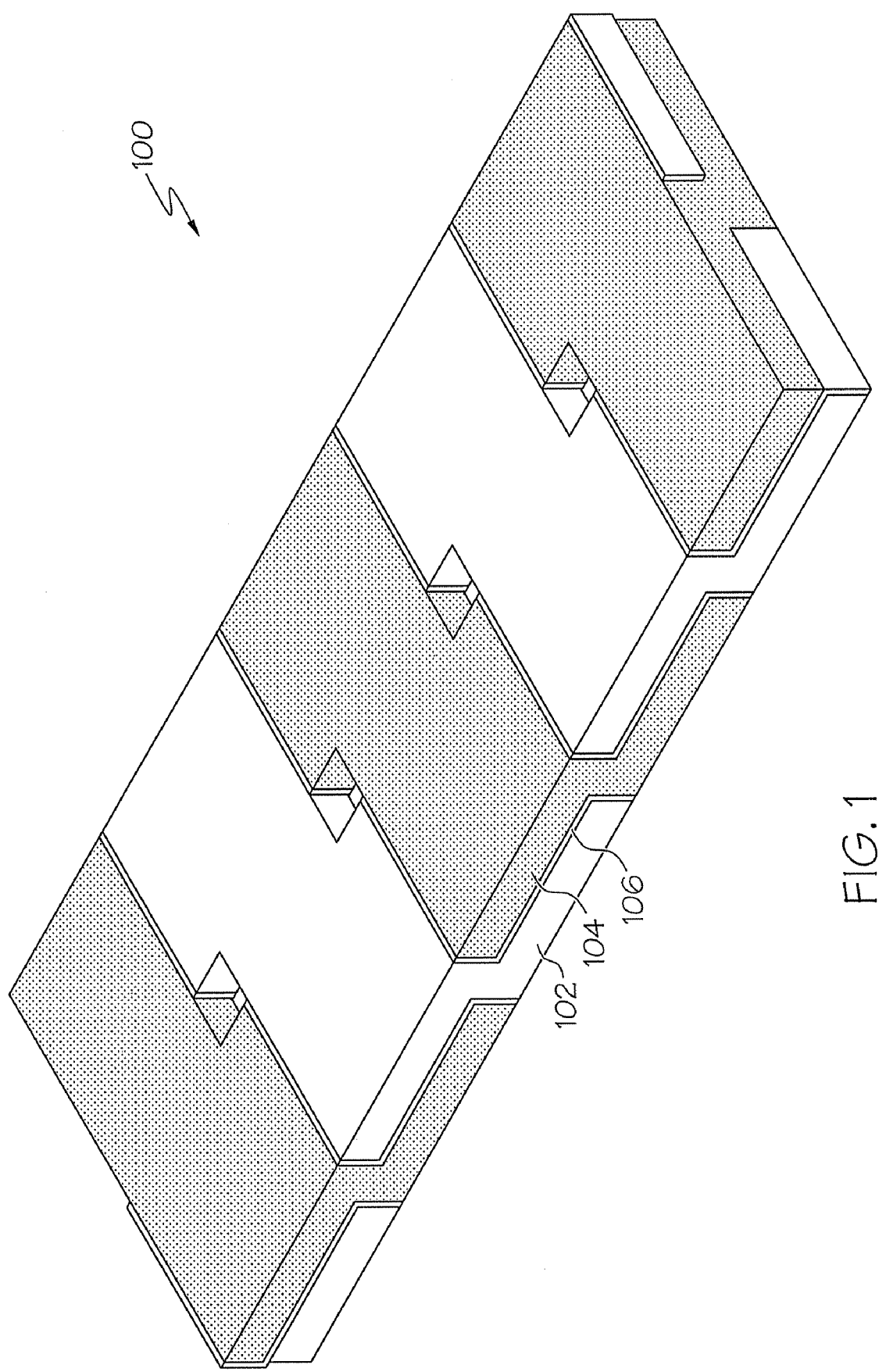
FIG. 1 is a partial perspective view of a power distribution bus bar according to an embodiment of the invention.
Figure 2:
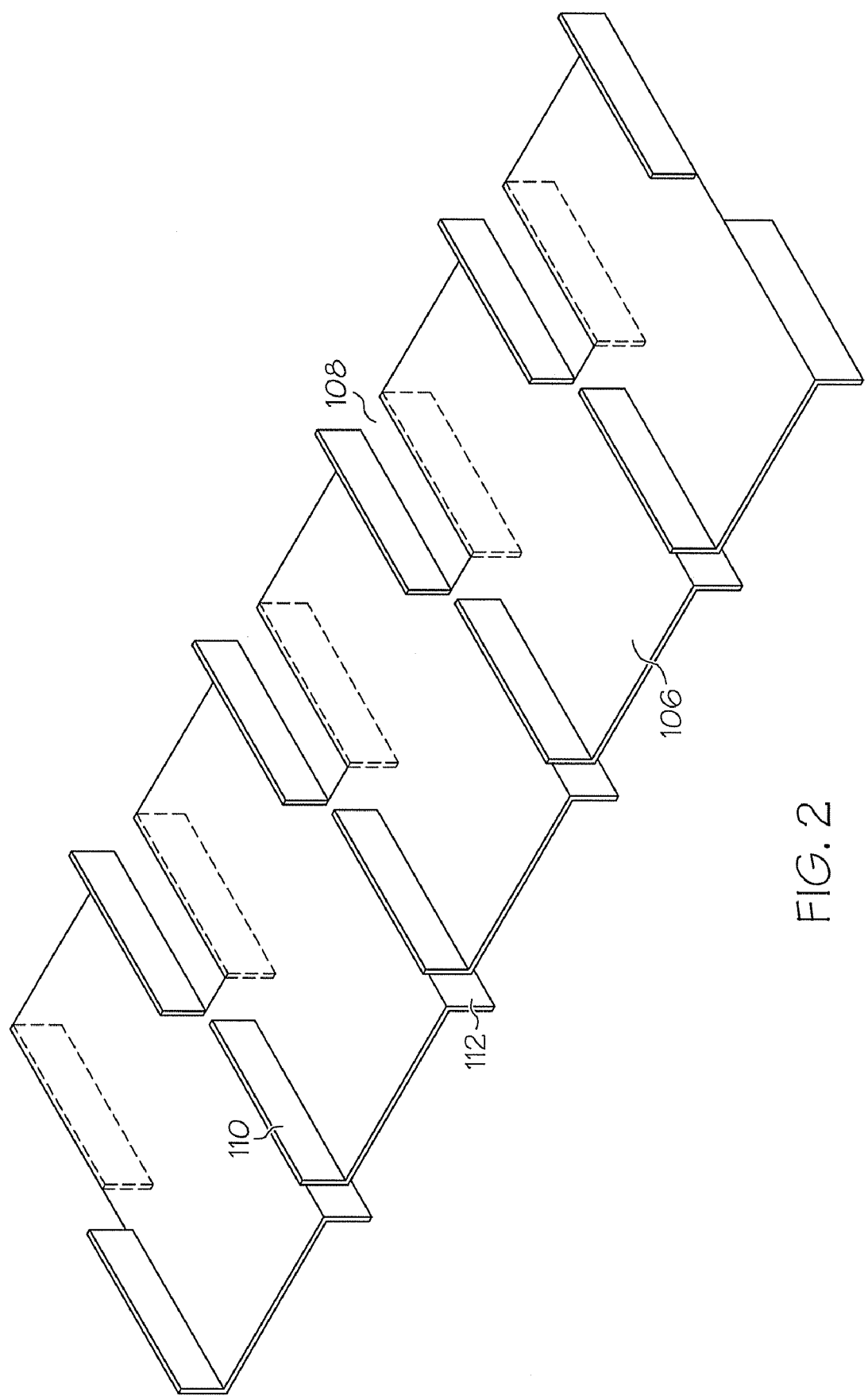
FIG. 2 is a partial perspective view of an insulator that separates the power and ground conductors according to an embodiment of the invention.

FIG. 1 is a partial perspective view of a symmetric bus bar 100 according to an embodiment of the invention. A pair of conductors 102 and 104 (shaded) is interwoven in an alternating pattern. The pair of conductors 102 and 104 may be power and ground conductors, respectively. An insulator 106 (FIG. 2) is sandwiched between the pair of conductors 102 and 104. The insulator 106 has an H-shape due to a series of slots 108 that permit the Z-shaped conductors 102 and 104 to traverse to opposite sides to form the interwoven alternating pattern of the symmetric bus bar 100. The insulator 106 has upward facing wings 110 and downward facing wings 112 cut from the series of slots 108 that act to insulate the vertical faces of the conductors 102 and 104 from each when they traverse to opposite sides. The alternating pattern of the conductors 102 and 104 provide for the cancellation of the overall induced magnetic fields along the symmetric bus bar 100.

The insulator 106 serves as a dielectric between the bus bar sections and allows for the reduction in electric field (E field) between the conductors 102 and 104 that is characterized as increased capacitance (i.e., lowered impedance to the load). It is not required for the dielectric insulator to be over the entire surface, but it would be an advantage for all surfaces to be highly capacitive. If there is no dielectric between facing surfaces then the distance between the surfaces must be carefully controlled to prevent contact.

Figure 3:
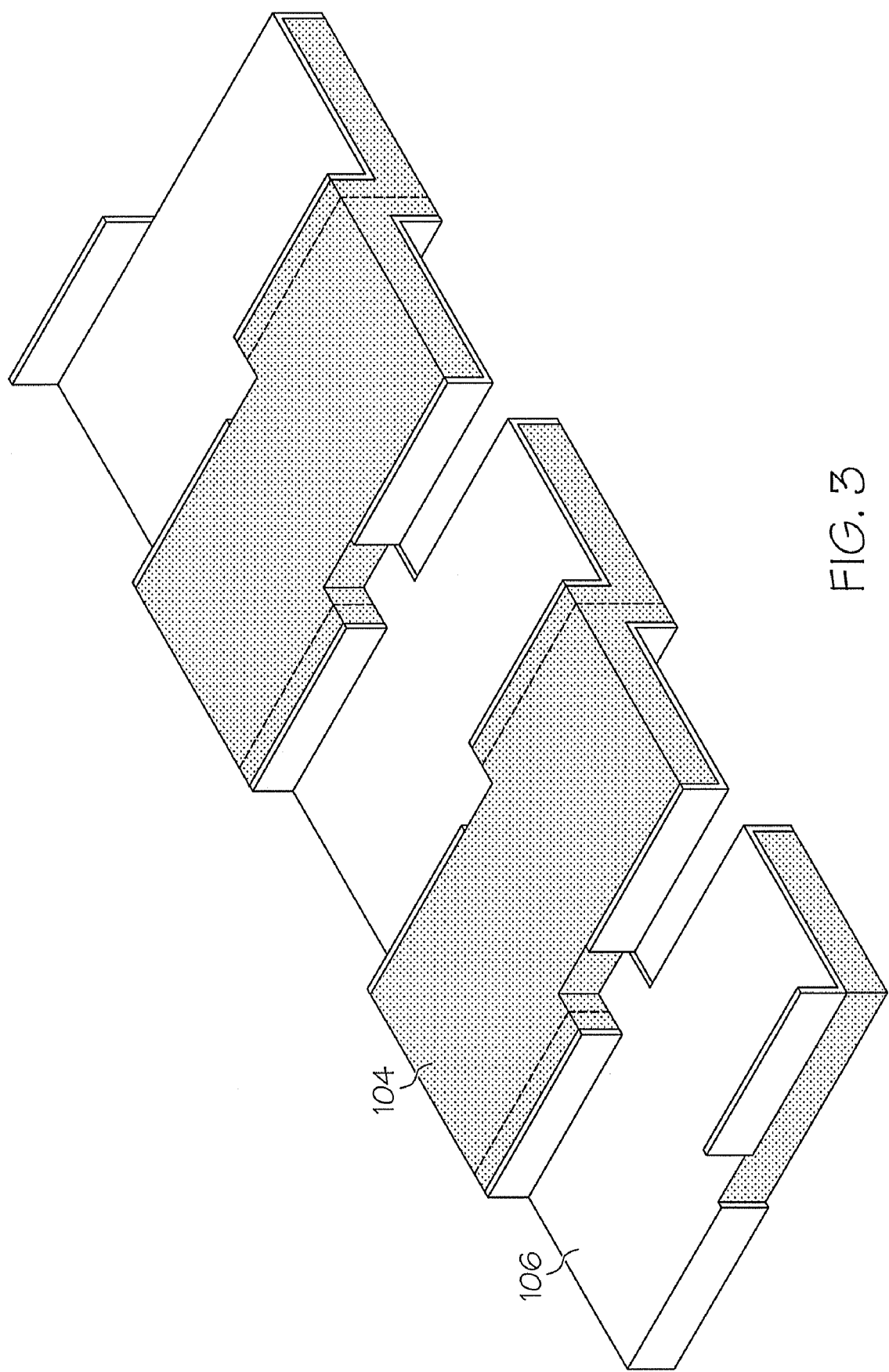
FIG. 3 is a partial perspective view of one of the conductors assembled with the insulator according to an embodiment of the invention.
Figure 4:
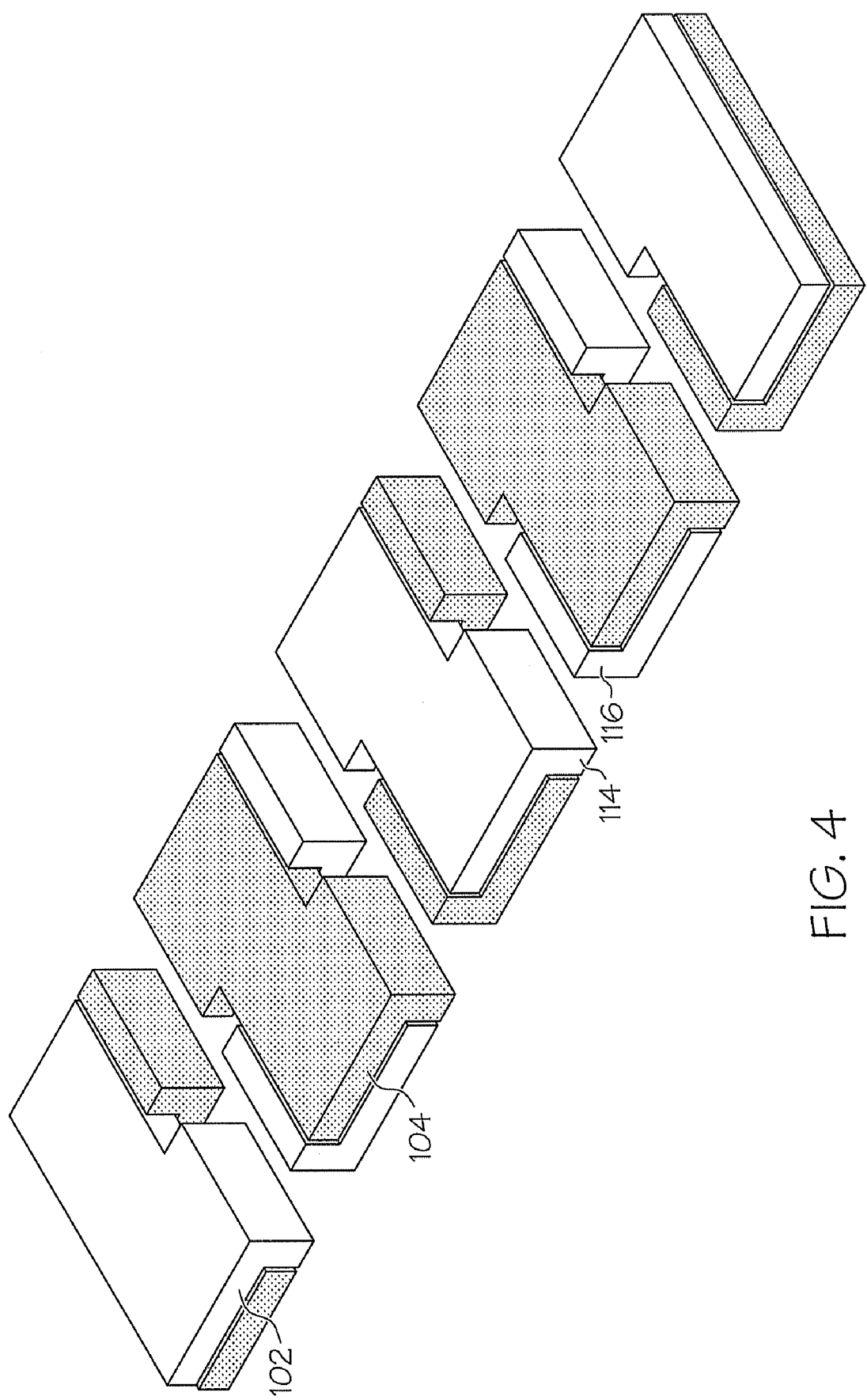
FIG. 4 is a partial exploded perspective view of the conductors assembled with the insulator removed to illustrate modularity according to an embodiment of the invention.

FIGS. 3 and 4 provide further illustration of the modular interweaving and interlocking nature of the conductors 102 and 104. In FIG. 3 conductor 102 has been removed to show the interweaving of conductor 104 with the insulator 106. The modular interlocking nature of the conductors 102 and 104 is shown in the exploded view of FIG. 4 with the removal of the insulating layer 106. Bridging connections 114 and 116 are an example of a solder joining area between modular segments for forming symmetric bus bar 100.

Figure 5:
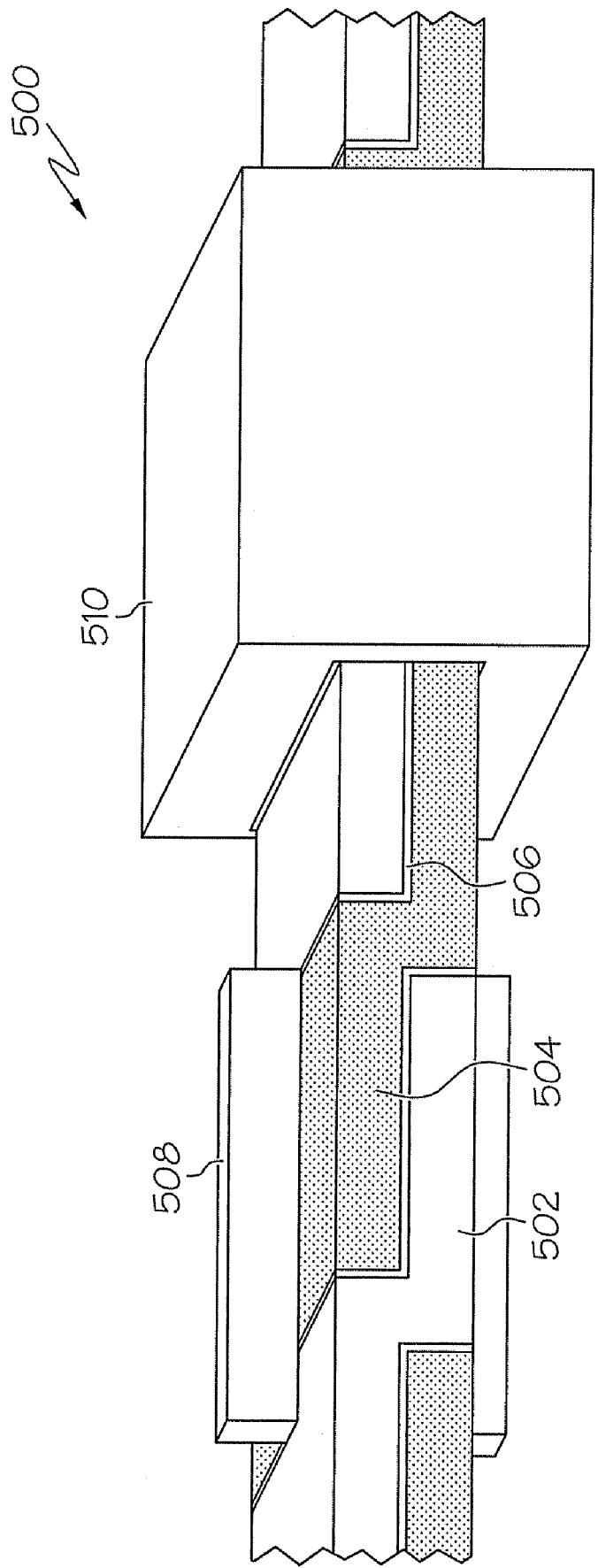
FIG. 5 is a partial perspective view of the power distribution bus bar with normal and common mode ferrites according to an embodiment of the invention.

In an alternative embodiment of the present invention ferrite suppressors are integrated with the symmetric bus bar 500 of FIG. 5. A ferrite is a passive electric component used to suppress high frequency noise and electromagnetic interference (EMI) in electronic circuits. Ferrite beads employ the mechanism of high dissipation of high frequency currents in a ferrite to build extremely effective high frequency noise suppression devices. The bus bar 500 has a similar construction to the bus bar 100 of FIGS. 1-4, with an insulator 506 sandwiched between a pair of interwoven and interlocking conductors 502 and 504. In addition, signal noise suppression is realized with the introduction of a normal mode ferrite 508 member (e.g., bead, core, etc.) and a common mode ferrite member 510. The normal mode ferrite 508 member passes through the center of conductors 502 and 504 and insulator 506 and act to dissipate unwanted signals on the conductors 502 and 504. The common mode ferrite member 510 encapsulates the bus bar 500 and suppresses noise-carrying currents that travel in the same direction on both of the conductors 502 and 504.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A twisted pair symmetric bus bar structure for electric power distribution, comprising:
   a first conductor;
   a second conductor;
   an insulator;
   wherein the first conductor and the second conductor form an interwoven alternating interlocking pattern;
   wherein the first and second conductors are formed from a series of Z-shaped sections;
   wherein the insulator is H-shaped and has a series of slots for receiving the first and second conductors; and
   wherein the insulator is sandwiched between the first and second conductor.

2. The structure of claim 1, wherein the first and second conductors are formed from a series of modular units with bridging connections; and
   wherein the modular units are joined by soldering the bridging connections together when the modular units are arranged in an alternating fashion.

3. The structure of claim 1, wherein the first and second conductors are individually formed from a single machine stamped conductor.

4. The structure of claim 1, wherein one or more common mode ferrite members encapsulate portions of the twisted pair symmetric bus bar.

5. The structure of claim 1, wherein one or more normal mode ferrite members are inserted in slots placed within the insulator and the first and second conductors.

6. The structure of claim 1, wherein the twisted pair symmetric bus bar has a square cross section.

7. The structure of claim 1, wherein the twisted pair symmetric bus bar has a rectangular cross section.

8. The structure of claim 1, wherein the insulator has upward facing wings and downward facing wings that are formed from the series of slots.

9. A method of forming a twisted pair symmetric bus bar, the method comprising:
   forming a first conductor;
   forming a second conductor;
   forming an insulator;
   wherein the first and second conductors are formed from a series of modular units with bridging connections;
   wherein the modular units are joined by soldering the bridging connections together when the modular units are arranged in an alternating fashion;
   wherein the insulator has a series of slots for receiving the bridging connections of the first and second conductors; and
   wherein the insulator is sandwiched between the first and second conductors.

10. A method of forming a twisted pair symmetric bus bar, the method comprising:
    forming a first conductor;
    forming a second conductor;

forming an insulator;

wherein the first and second conductors are individually formed from a single machine stamped conductor;

wherein the insulator has a series of slots for receiving the first and second conductors;

wherein the insulator is sandwiched between the first and second conductors; and wherein the first and second conductors form an alternating interwoven structure.

* * * * *